July 28, 1942.  B. A. JEFFERY  2,290,910
SEMIAUTOMATIC PRESS
Filed Dec. 21, 1938  9 Sheets-Sheet 1

Benjamin A. Jeffery
INVENTOR
BY Owen & Owen
ATTORNEYS

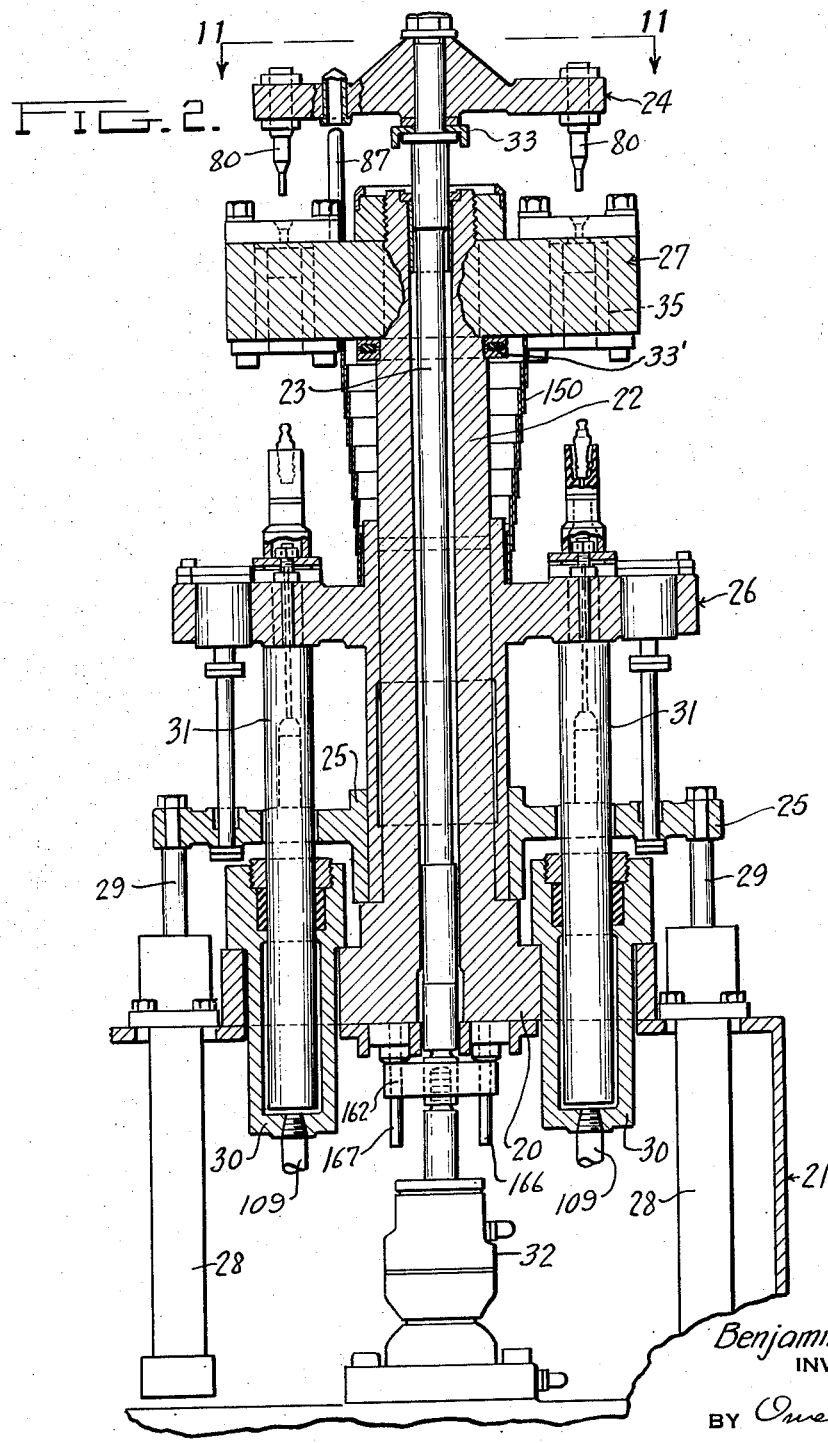

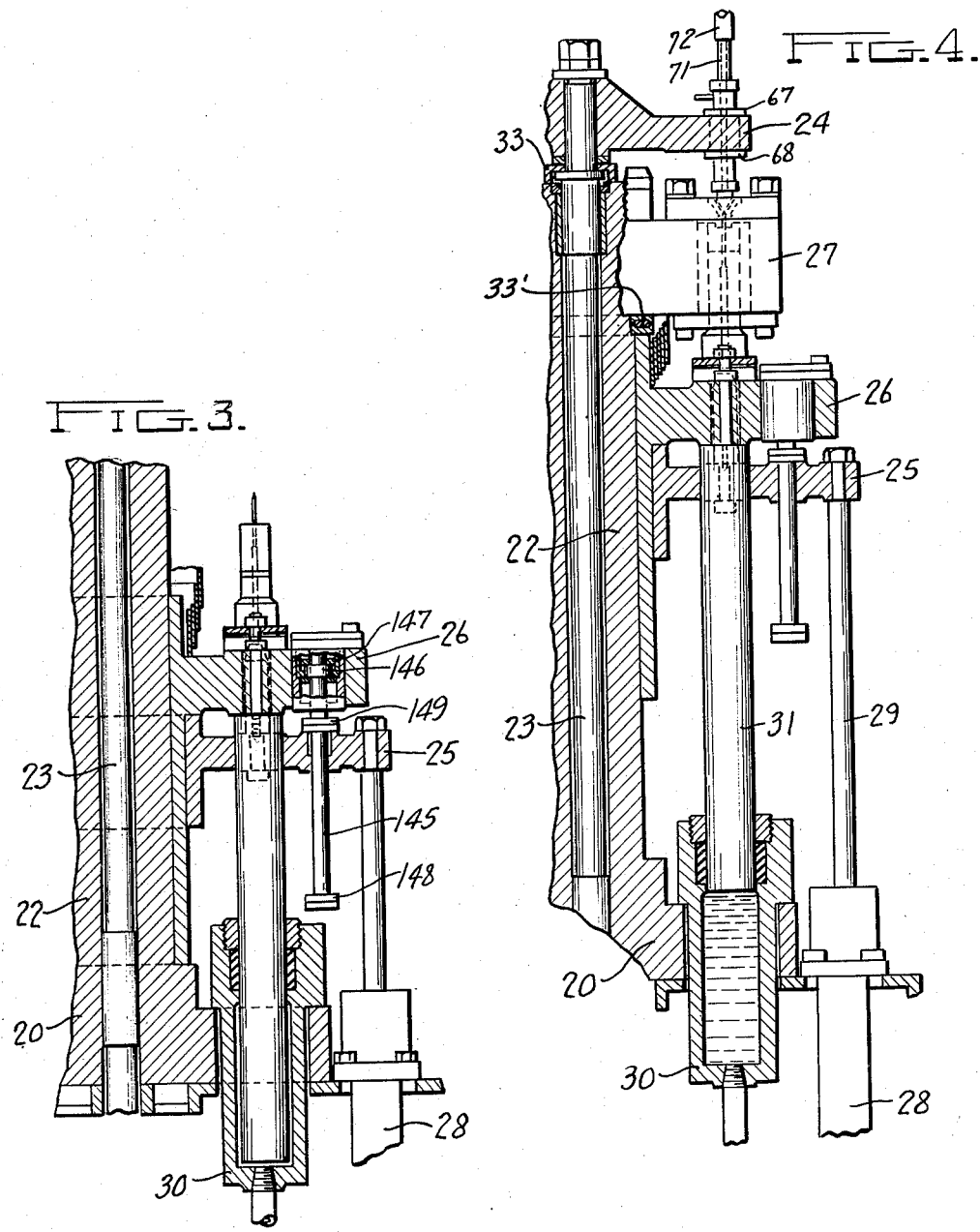

July 28, 1942.   B. A. JEFFERY   2,290,910
SEMIAUTOMATIC PRESS
Filed Dec. 21, 1938   9 Sheets-Sheet 4
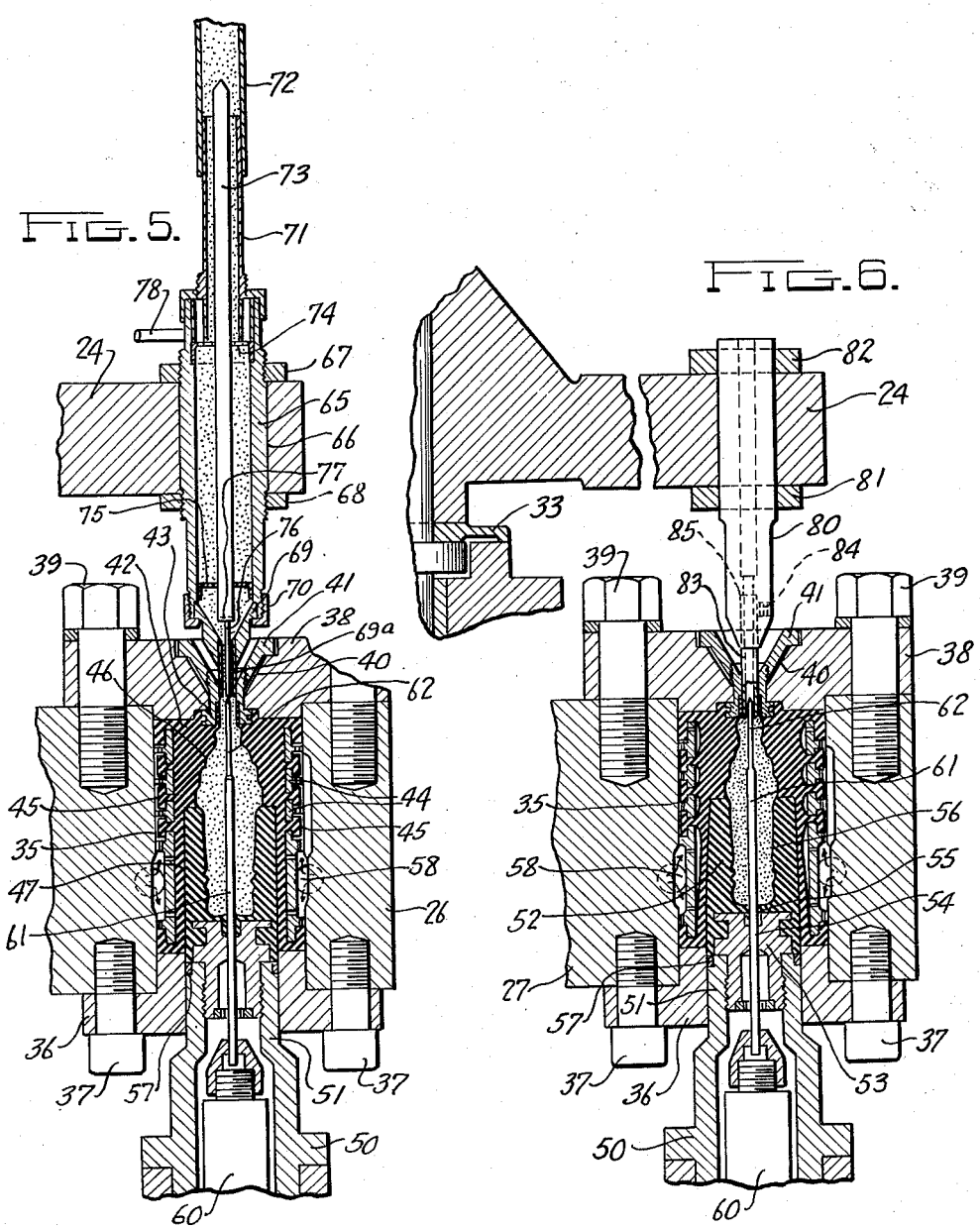
Benjamin A. Jeffery
INVENTOR
BY Owen & Owen
ATTORNEYS

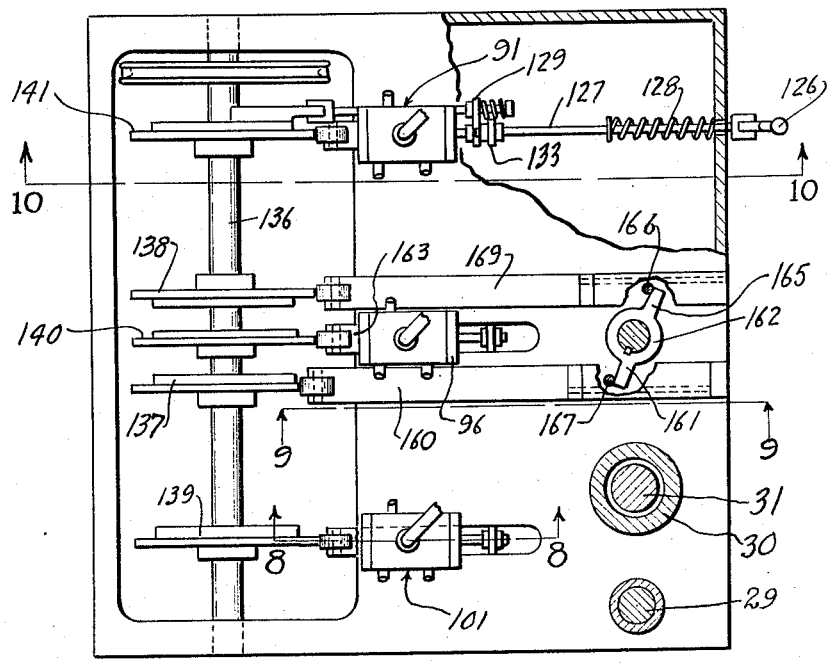
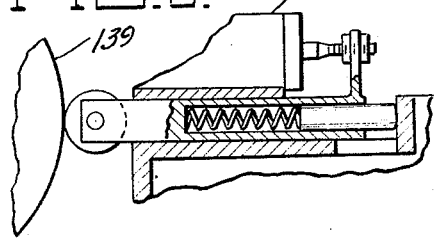
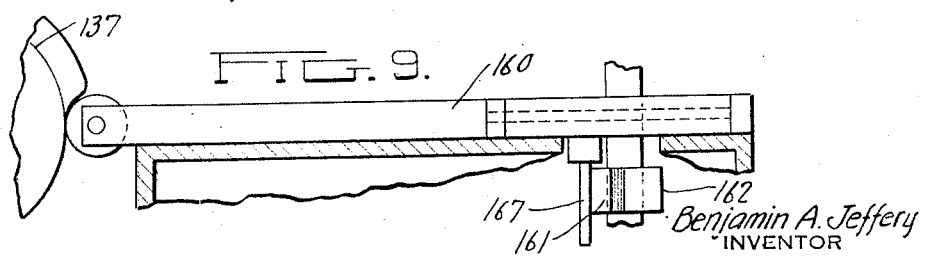

July 28, 1942. B. A. JEFFERY 2,290,910
SEMIAUTOMATIC PRESS
Filed Dec. 21, 1938 9 Sheets-Sheet 6
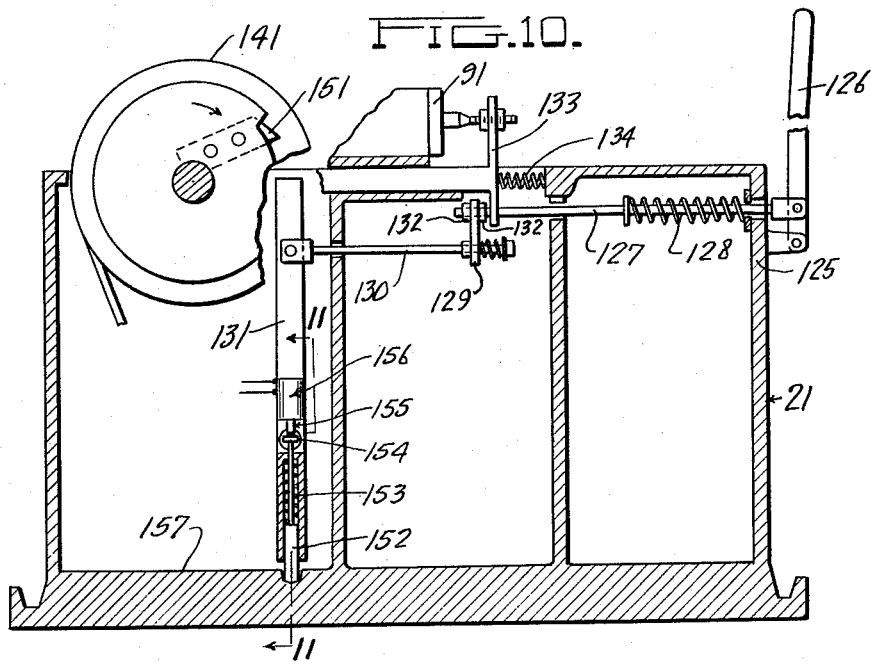
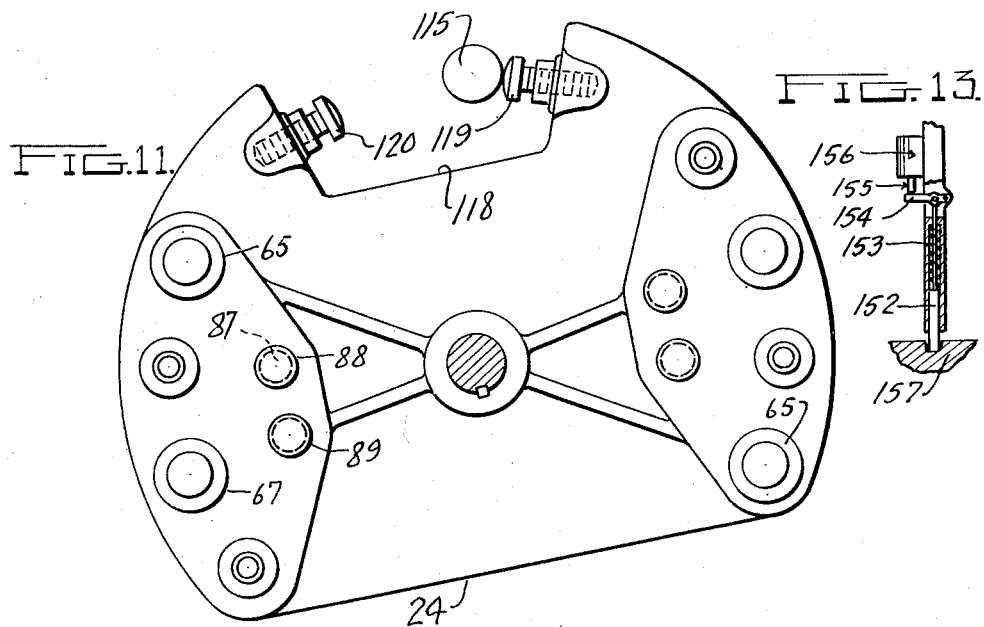
Benjamin A. Jeffery
INVENTOR
BY Owen & Owen
ATTORNEY

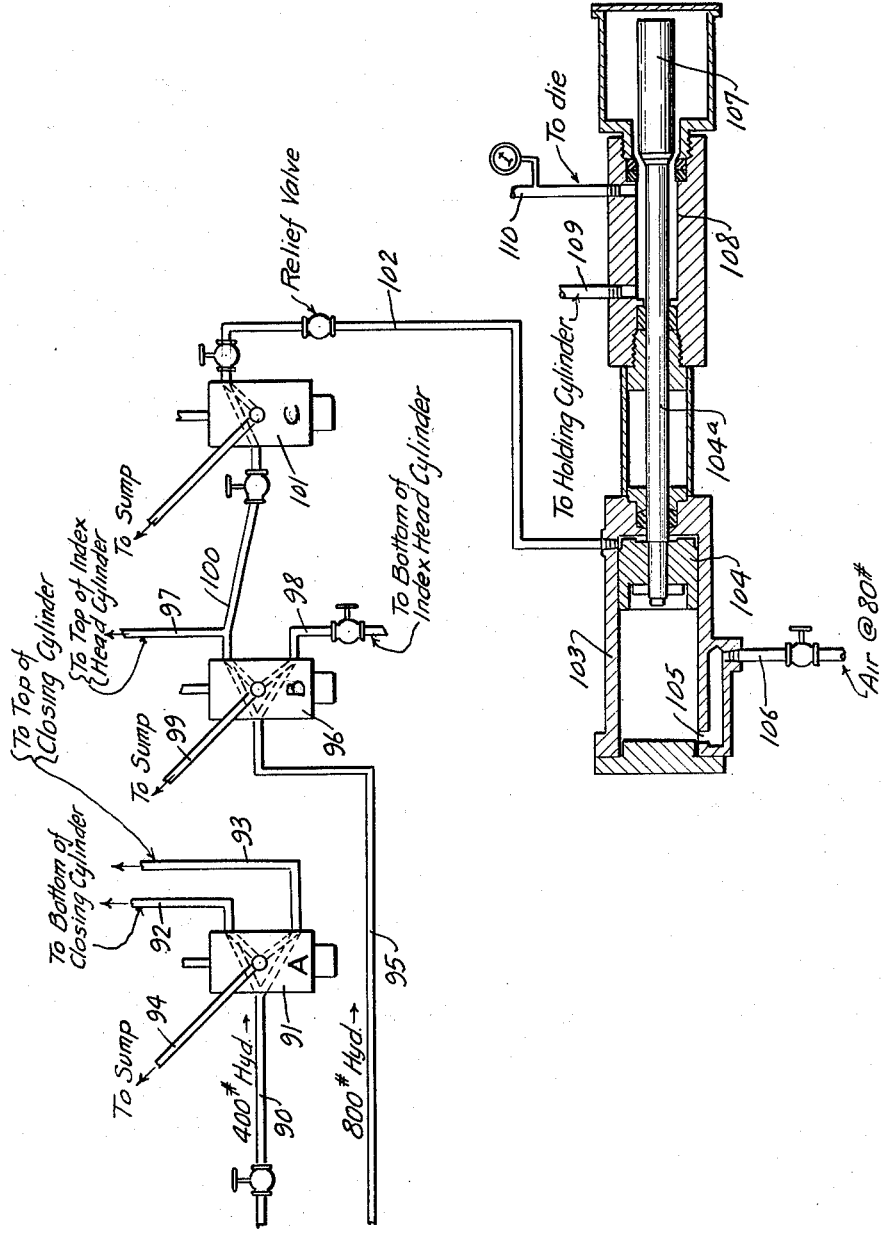

July 28, 1942.  B. A. JEFFERY  2,290,910
SEMIAUTOMATIC PRESS
Filed Dec. 21, 1938  9 Sheets-Sheet 8

Inventor
Benjamin A. Jeffery
By Owen & Owen
Attorneys

July 28, 1942.  B. A. JEFFERY  2,290,910
SEMIAUTOMATIC PRESS
Filed Dec. 21, 1938  9 Sheets-Sheet 9
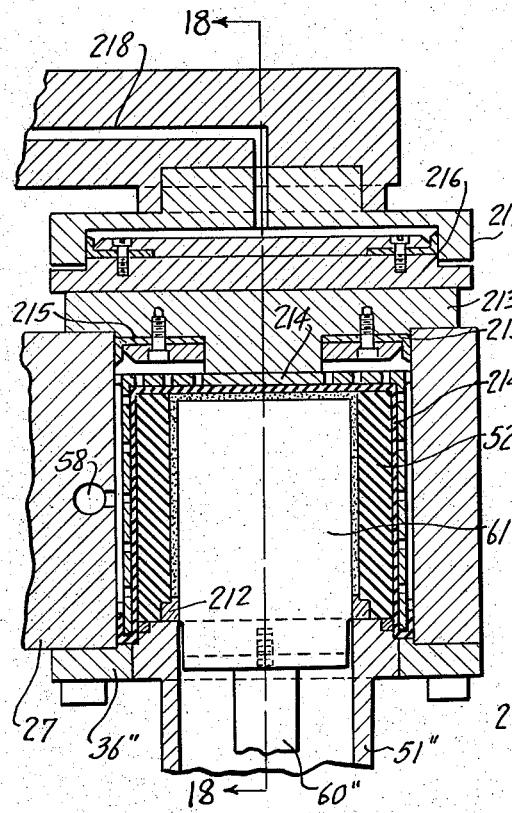
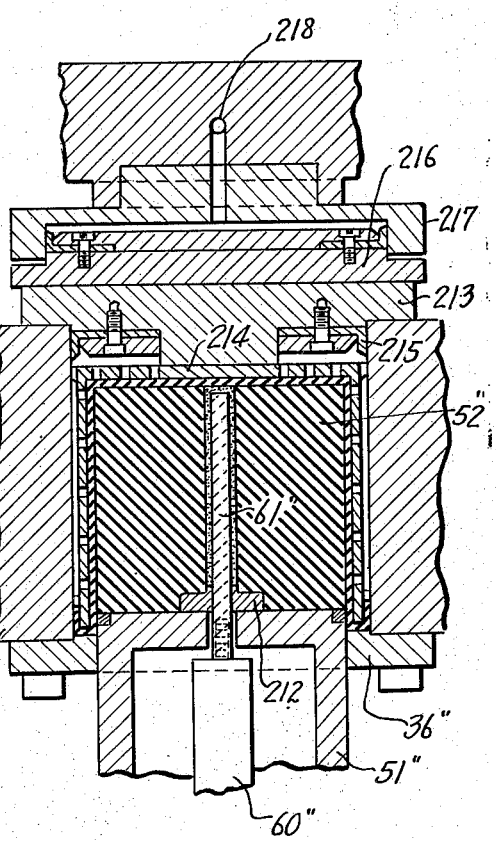
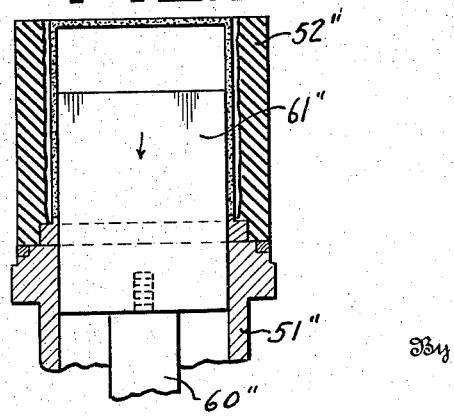
Inventor
Benjamin A. Jeffery
By Owen & Owen
Attorneys Patented July 28, 1942

2,290,910

UNITED STATES PATENT OFFICE 2,290,910

SEMIAUTOMATIC PRESS

Benjamin A. Jeffery, Clarkston, Mich., assignor to Champion Spark Plug Company, Toledo, Ohio, a corporation of Delaware Application December 21, 1938, Serial No. 246,927

28 Claims. (Cl. 25—27)

This invention relates to apparatus for pressing dry ceramic powder or the like, and more particularly to a semiautomatic press.

The object of the invention is to provide a press in which ceramic powder can be consolidated into a self-sustaining body preparatory to firing, in a reliable, uniform and economical manner.

Another object of the invention is to provide apparatus whereby ceramic powder may be compressed under high pressure and the pressure released in such a way as to avoid disrupting the compressed body.

Other objects of the invention will appear as the description proceeds.

In the accompanying drawings forming a part of this specification:

Fig. 2 is a vertical section approximately along the line 2—2 of Fig. 1;

Figs. 3 and 4 are details showing in different positions parts which are shown at the right of Fig. 2;

Fig. 5 is an enlarged vertical section of the mold in filling position;

Fig. 6 is an enlarged vertical section of the mold in pressing position;

Fig. 7 is a plan view of the cam control apparatus taken substantially along the line 7—7 of Fig. 1;

Figure 14:
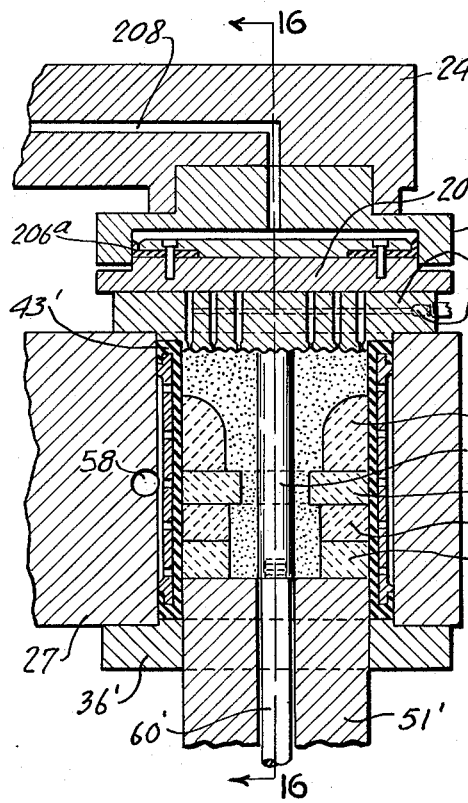
Figure 16:
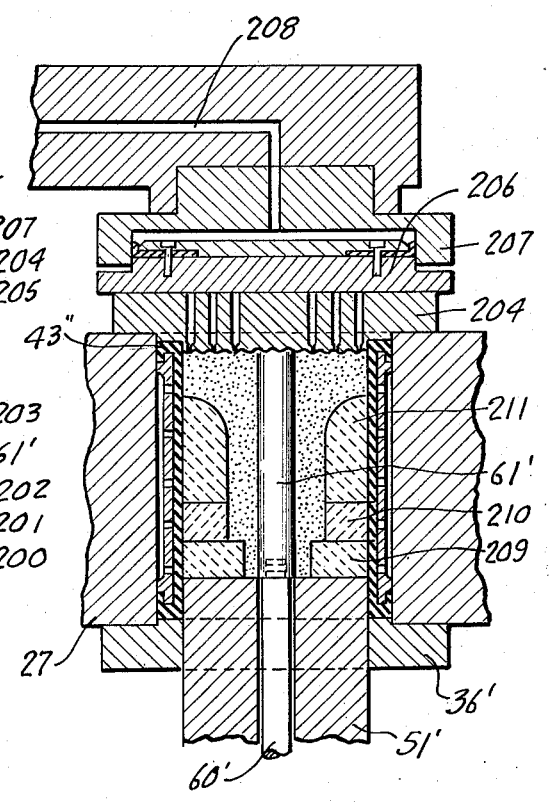
Figure 15:
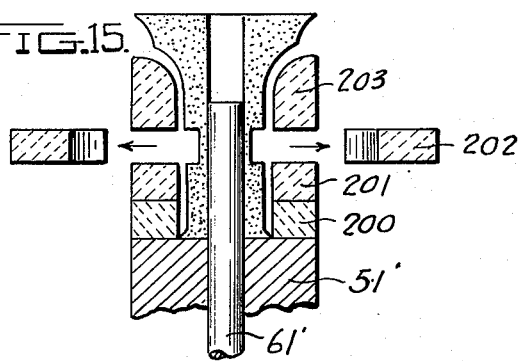

Figs. 8, 9 and 10 are sections taken substantially along the lines 8—8, 9—9 and 10—10, respectively, upon Fig. 7;

Fig. 11 is a plan view of the oscillating head on the line 11—11 on Fig. 2;

Fig. 12 is a diagrammatic view of the hydraulic pressure control;

Fig. 13 is a detail of a limit switch;

Fig. 14 is a section somewhat similar to 6, but showing a mold for a different article, and some incident modifications;

Fig. 15 is a diagrammatical section showing the position of the filler rings when an article is removed from a mold like that shown in Fig. 14;

Fig. 16 is a view similar to Fig. 14, but showing different filler rings;

Fig. 17 is similar to Fig. 14, but shows a mold for a different article;

Fig. 18 is a section on the line 18—18 of Fig. 17;

Fig. 19 is a diagrammatic detail showing a pressed article lowered from the mold shown in Fig. 18, but with the core still therein.

The apparatus described in the drawings comprises a base 20 mounted upon a support 21 and carrying a hollow central column 22, within which there is arranged a shaft 23 for vertical reciprocation and for oscillation. At the top of shaft 23 there is mounted an oscillating head 24. Vertically slidable with respect to column 22 there is a lower slide 25 and an upper slide 26. A stationary head 27 is mounted upon column 22 between the upper slide and the oscillating head. The reciprocation of the lower slide is controlled by cylinders 28, having piston rods 29 connected to the slide. Cylinders 30 are connected by piston rods 31 with the upper slide and exert the final pressure to hold the slide in its upper position. The central shaft 23 is reciprocated vertically by means of cylinder 32. A spring 33 is provided around the central shaft above head 27, and is deflected when the oscillating head is lowered.

Stationary head 27 is provided with four cylindrical openings 35, each of which is adapted to receive a mold. One of these molds and associated parts is shown in Figs. 5 and 6, and since all four are alike the description of one applies to all. A collar 36 is fixed by screws 37 around the bottom of opening 35 and a similar collar 38 is secured by screws 39 around the upper end of opening 35. Collar 38 is provided with a central opening 40 which flares upwardly and receives a funnel 41.

Within opening 35 there is arranged a stationary rubber mold part 42. Within the upper part of the rubber member 42 there is a metal ring 43 which fits within the lower part of the opening in collar 38 and forms in effect a continuation of the opening in the bottom of funnel 41. Rings 44 are mounted in the sides of rubber member 42 and hold the flanges 45 against inward movement. The upper portion has a cavity 46 with a shape substantially like that which it is desired to impart to the upper end of a pressed article, while the opening 47 through the lower part of member 42 is cylindrical and forms substantially a continuation of the cylindrical central opening through collar 36.

The upper slide 26 is provided with a mold-carrier 50 for each mold. Mold-carrier 50 is formed with a cylindrical upper end 51 adapted to fit within the central bore of collar 36. Upon this cylindrical end of mold support 50 there is mounted a rubber mold part 52. A metal member 53 is embedded in the lower part of mold member 52 and is fastened within the cylindrical end 51 of support 50. There is a central opening 54 through metal part 53 and through the relatively thin rubber 55 above member 53. The member 52 is provided with a cavity 56 which complements cavity 46 to complete the pressing cavity. At the upper end of part 51 there is a removable "grief" ring 57, which receives the wear at the junction between the rubber and metal, and may be replaced when worn. Head 27 is provided with an inlet opening 58 for admitting liquid under pressure.

Lower slide 25 carries a post 60 for each mold, this post being in alignment with carrier 50 on the upper side and adapted to telescope within the respective carrier. To the upper end of post 60 there is removably attached a core rod 61, which has a reduced upper end 62.

When the parts are in the position in which they are shown in Figs. 5 and 6 with mold part 52 inserted within the mold part 42 and with the core rod raised, it will be seen that they enclose a cavity adapted to receive material which may be pressed into the desired spark plug core.

The oscillating head 24 at the upper end of central shaft 23 is provided with a filling device for each mold. Each of these devices comprises a cylindrical hopper 65 affixed within the cylindrical opening 66 in the oscillating head. In the construction shown the cylindrical hopper 65 is affixed in vertically adjustable position by nuts 67 and 68, screwed upon cylindrical member 65 above and below the head. In the lower end of the cylindrical hopper there is a funnel shaped member 69 which is held in position by a collar 70 screwed on the lower end of hopper 65, the lower cylindrical end of funnel member 69 being designated by 69ª. To the upper end of hopper 65 there is attached a nipple 71 to which there is connected a feed hose 72 which forms a flexible conduit between the cylindrical hopper and any suitable supply of powdered material.

A vertically reciprocable rod 73 is held against lateral movement in the hopper by means of spiders 74 and 75. The lower end of rod 73 is provided with a reduced downwardly projecting pin 76 which normally extends downward through funnel 69. When the feed hopper is lowered with the oscillating head, as will be described later, pin 76 is positioned to contact the reduced upper end 62 of core rod 61 and stop the downward movement of rod 73. The lower end 77 of rod 73 is thereby lifted above the discharge opening in funnel 69 and permits discharge of the material from the hopper into the pressing cavity.

A pipe 78 is provided, leading to the upper end of hopper 65, for a purpose which will be described later.

The oscillating head is provided also with means for closing the filling opening during pressure. For each mold there is provided a holder 80 fixed in the head by means of nuts 81 and 82. At the bottom of each holder there is provided a cylindrical member 83, the bottom of which is preferably shaped to form the desired petticoat at the end of the spark plug core, but which of course may be shaped in any desired manner in accordance with the object which is being pressed. In the construction shown, the cylindrical member 83 is held in place in holder 80 by means of a set screw 84, but it rests against shoulder 85 so that any heavy pressure is exerted by the shoulder rather than the set screw.

A vertical guide pin 87 is mounted upon stationary head 27 and is adapted to enter one or the other of guide openings 88 or 89 in the oscillating head when the oscillating head is lowered into operative position, but when the oscillating head is raised, it is above guide pin 87, as shown in Fig. 2.

Fig. 12 discloses a diagrammatic view of the hydraulic control. In this view pipe 90 leads from a source of relatively low pressure to a four-way valve 91, which is adapted to direct the pressure alternately through pipe 92 to the bottom of each cylinder 28 or through pipe 93 to the top of the cylinder, that end of the cylinder to which pressure is not applied being allowed relief through pipe 94.

A relatively high pressure line 95 supplies pressure to four-way valve 96 in order to direct pressure alternately through pipe 97 to the top of cylinder 32 or through pipe 98 to the bottom of cylinder 32, the end of the cylinder to which pressure is not being directed being provided with relief through pipe 99. A branch 100 of pipe 97 leads to a valve 101 which connects the pressure line through a pipe 102 to intensifier cylinder 103, which is provided with a piston 104. At the other end of cylinder 103 there is provided an inlet 105 for pressure from an air line 106. Piston 104 is connected by a rod 104ª with a piston 107 adapted to operate within the high pressure cylinder 108 of the intensifier. Cylinder 108 is connected by pipe 109 to cylinders 30 and by pipe 110 to the pressure opening 58 surrounding the rubber mold.

Figure 1:
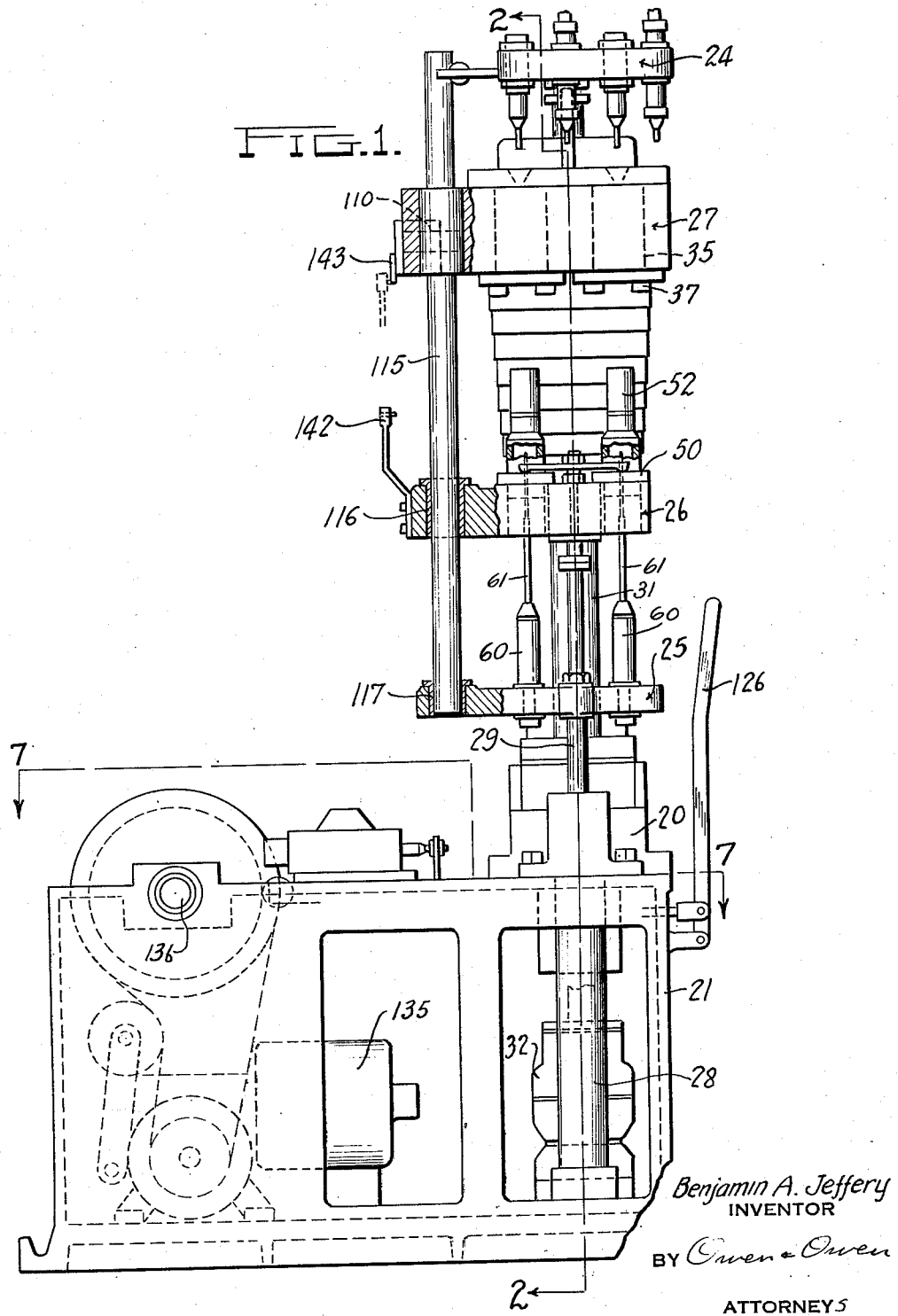
Figure 1 is a side elevation of a portion of the apparatus, parts being broken away for a better illustration.

As will be seen most readily from Figs. 1 and 11, there is a large guide rod 115 mounted in the stationary head and projecting downward through opening 116 in the upper slide and 117 in the lower slide. It also projects upward above the stationary head and into a notch 118 in the oscillating head. The oscillating head is provided with stop screws 119 and 120 adapted to contact the guide rod when the oscillating head is in one or the other of its extreme positions.

The control mechanism comprises the following arrangement: Upon the housing 125 for the control mechanism, which, in the form shown, constitutes a part of support 21, there is mounted a handle 126 connected to an operating rod 127 which is normally urged to the left, as viewed in Fig. 10, by a spring 128. On the end of the rod 127 there is mounted a lug 129 which slides upon a rod 130, which in turn is pivoted to a stop device 131, which will be described more in detail later.

The lug 129 is affixed adjustably upon rod 127 by means of nuts 132, and when the rod is operated by the handle it is adapted to actuate a slide 133 which in turn is connected to the valve 91. Slide 133 is normally pressed to the left as viewed in Fig. 10, by a spring 134.

A timing control motor 135 is connected by suitable intermediate driving means with a cam shaft 136. This shaft carries cams 137 and 138 which control the oscillation of the oscillating head, cam 141, which partially controls valve 91, cam 140 for valve 96, and cam 139 for valve 101.

A contact 142 mounted upon the upper slide makes connection with contact 143 on the stationary head when the upper side is fully raised and through appropriate electrical connections starts the rotation of the cam shaft when this contact is made.

Having described the general construction of the machine, the operation will be fairly obvious, but for convenience the successive operations of the apparatus will be described in order.

With the apparatus in the position disclosed in

Fig. 1, the handle 126 is pulled to the right as viewed on Fig. 10 and thereby operates valve 91 to admit pressure to the lower end of cylinders 28. This raises lower slide 25 first to the position in which it is shown in Fig. 3, at which time it picks up the upper slide.

As shown on Fig. 3, there is a bumper rod 145 having on its upper end a piston 146 operating in a cylinder 147 in the upper slide. The bumper rod extends through an opening in the lower slide and has mounted thereon a lower stop member 148 and an upper stop member 149. As will be seen, when the parts are in the position in which they are shown in Fig. 2, the lower slide contacts stop 148 and insures the drawing of the piston to the lower end of the cylinder. When the lower slide approaches the upper slide, it contacts the upper stop member 149 and raises the bumper piston in the cylinder before the lower slide contacts the upper slide. This is to prevent jar when the lower slide picks up the upper slide.

After the two slides contact in the manner described, continued operation raises the two slides together. They are forced upward by the pressure in cylinders 28. At this time the valve 96 is in the position directing pressure to the bottom of cylinder 32 so that the oscillating head is raised, and no pressure is transmitted to cylinder 103, and the liquid connected to cylinders 30 is therefore under only approximately atmospheric pressure. As the upper slide is lifted, the liquid is drawn into cylinders 30 by suction and with substantially no resistance.

As the lower slide rises with respect to the upper slide, the central core rod 61 is raised into position with respect to the mold part 52. As the upper slide is raised with the lower slide from the position in which it is shown in Fig. 3 to that in which it is shown in Fig. 4, the mold part 52 and the core rod are raised into position with respect to the rest of the mold, as shown in Figs. 4 and 5.

The handle 126 should be held in operative position until the lower slide is completely raised in order to close contacts 142 and 143. If the handle is released before the slides are fully raised, valve 91 will be returned to the position in which it directs pressure to the upper end of cylinder 28 and the slides will be returned to their lower position. Even if the valve did not operate promptly enough to prevent the closing of contacts 142 and 143, a premature release of handle 126 would prevent continued operation of the machine, as will be described later.

Surrounding the joint between the upper slide and the central column, there is a helical telescopic shield 150 which forms a guard against dust entering that joint. As will be seen, this telescopes when the upper slide is raised to its upper position, but always completely encloses the surface of the column between the upper slide and the stationary head.

As soon as contacts 142 and 143 are closed, the control motor 135 is energized and through a speed reducing connection starts the rotation of cam shaft 136. As will be readily seen from Fig. 10, cam 141 is quickly rotated into position to hold valve 91 in the position into which it is moved by handle 126, so that a continued pressure will be directed to the bottom of cylinders 28. Adjacent the cam, there is provided a stop lug 151 which may encounter the top of stop device 131. This device is arranged to operate at any time when the cam shaft fails to stop in the proper position, or starts to rotate when handle 126 is not pulled to the right. It will be readily seen that when handle 126 is drawn to starting position, the upper end of member 131 is withdrawn from the path of lug 151. While this stop device will operate as a safety device in starting the machine, it is more essentially a safety device to prevent the cam shaft from turning beyond proper position at the close of a pressing cycle, as will be described later.

When lug 151 encounters the upper end of member 131, it depresses that member. Telescoped in the lower end of member 131 there is a plunger 152 normally thrust outward by a spring 153. When member 131 is forced down against the action of spring 153, the upper end of plunger 152 contacts the operating lever 154, which in turn operates the actuating plunger 155 of a limit switch 156. This switch is arranged in any well known manner in the starting circuit of motor 135, so that when it is operating the motor is stopped. This is to insure that in no case will power from the motor 135 be continued when the cam shaft attempts to rotate beyond the proper position until stop member 131 is withdrawn by handle 126. It will be readily seen that a relatively short movement of member 131 is possible before it is lowered and contacts the base 157 of the machine and thereby affords a positive stop against further rotation of cam shaft 136.

When handle 126 is properly withdrawn and maintained in starting position until the slides are fully raised and mold parts are properly positioned for receiving material, the motor 135 is started, as described above, and operates the cams to produce automatically the successive pressing operations. The first operation after the slides are fully raised is caused by cam 137, which operates slide 160, which carries a pin 161 that contacts a projection 161 on collar 162 keyed for vertical movement on central shaft 23, causing oscillation of the shaft. This operation swings the oscillating head so as to bring the filling hoppers in line above the molds. Thereafter cam 140 operates slide 163, which moves valve 96 to direct pressure fluid to the upper end of cylinder 32, which forces downward central shaft 23 and with it the oscillating head. The centering pin 87 insures proper registry between the filling devices and the molds.

At the end of the downward movement of the oscillating head, the valves within the filling hoppers contact the upper ends of the core rods, as previously described, and thereby open the outlets from the filling hoppers.

The material for which the press is particularly designed is composed of minute rounded pellets resulting from drying finely sprayed slip. Such material flows very readily and fills the molding spaces completely and evenly. Also, it can be conducted for many feet, if desired, through a flexible hose from a storage bin to the upper end of the filling hopper. While such readily flowing powder will fill the molds fairly well merely by gravity, the action is expedited and made somewhat more certain by the admission of air under pressure to the top of each filling hopper, through pipes 78. Such air pressure is not high, and while it readily permeates material of the kind described, still there is sufficient resistance in a hose or other pipe line of several feet between the storage bin and the feeding hopper so that there is no necessity for the storage bin to be closed.

After a short interval for the filling operation, the valve 96 is operated once more to direct the pressing fluid to the bottom of cylinder 32 so as to raise the oscillating head. As the oscillating head is raised, the valve in the bottom of each filling hopper is closed. However, there is sufficient powder in the outlet beneath the valve so as to insure complete filling of the mold. It will be understood that normally there is provided a chance for air to escape from the mold cavity around member 69ᴬ during the filling operation.

As soon as the pressure fluid has been directed to the bottom of cylinder 32 long enough to insure the raising of the oscillating head above the guide pin, cam 138 operates slide 169, which carries a pin 166 that contacts a projection 165 on collar 162 and oscillates the head back to its original position with the petticoat former 83 in line with the top of the mold. Thereupon valve 96 is once more actuated and the oscillating head is lowered into pressing position as shown in Fig. 6. It will be noted that pressure from pipe 97 is applied to the top of cylinder 32 at this time and that the petticoat formers present comparatively small cross-sections at their lower ends, so that notwithstanding the resistance of spring 33, the oscillating head is held very firmly in its lowered position.

As soon as the upper end of the mold is thus closed, valve 101 is operated, which directs the high pressure fluid to the intensifier cylinder and this in turn actuates the piston 107 so that very high pressure is transmitted through pipe 109 to the lower end of cylinders 30, thereby holding the bottom of the mold firmly in position, and at the same time high pressure fluid from the same source is forced through pipe 110 into the cavity around the rubber walls of the mold, and presses those walls in against the powder in the mold cavity.

The initial movement of the mold walls is regulated somewhat by the thickness of the walls and by the resistance of rings 44, which are arranged for the desired effect upon this initial movement of the walls, as well as for the desired effect upon the subsequent expansion of the mold. During this initial movement of the mold walls, much of the reduction in size of the mold cavity is effected. After this initial movement has been effected, the material resists further compression, and the very high pressure thereby becomes fully effective. Under this very high pressure, the resistance of the mold walls becomes relatively negligible, and pressure is transmitted to the surfaces of the mold cavity substantially equally in all directions, even through the comparatively thin rubber sheet at the bottom of the mold cavity.

After sufficient compression has been effected, valve 96 is operated to release the downward pressure on the oscillating head and in turn operates through valve 101 to release the pressure upon the mold walls and the bottom of cylinders 30. This releases the resistance to the expansion of the rubber walls of the mold and at the same time releases the resistance to upward movement of shaft 23. Spring 33 immediately causes a slight upward movement of the oscillating head simultaneously with the release of pressure on the sides of the mold. A rubber ring 33', as shown on Fig. 2, or other resilient means may be employed between slide 26 and head 27, in place of or together with spring 33, to produce the desired longitudinal relief.

When powder is highly compressed in the manner described, and this high pressure is released, there is a slight expansion of the pressed powder. While this movement of the powder is very small, it is very forcible, and if there is no provision for longitudinal relief at the same time that the mold walls relieve the lateral compression, this resistance to longitudinal expansion results in shattering the compressed article. Therefore, this simultaneous relief of longitudinal and lateral compression is very important.

When the article has been properly compressed in the manner described and valve 96 shifted, it not only relieves pressure of the petticoat former immediately, but also pressure fluid is directed to the bottom of cylinder 32 so that the oscillating head is raised once more to the original position. Thereupon cam 141 permits the operation of valve 91 by spring 134 so as to direct pressure fluid to the upper end of cylinders 28. Thereupon the slides start downward immediately, breaking the contact which closes the circuit through motor 135, and thereby stopping the motor and the cam shaft. It will be readily understood that the two slides move downward together, carrying with them the compressed article which is released sufficiently so as to move downward freely from the upper mold part. When the upper slide reaches the lower limit of its travel, in the position shown in Fig. 3, the lower slide continues downward, withdrawing the core rod from the article. Thereupon the article can be freely lifted from the lower mold half and removed, and the apparatus is then ready to repeat its cycle.

As previously pointed out, member 131 and associated parts insure the stoppage of the cam shaft before it has passed the proper starting position.

Figs. 14 to 19, inclusive, disclose modifications by which different articles may be made. In Fig. 14, there is shown a mold for making a somewhat spool-shaped article. In accordance with this disclosure, there is mounted in the stationary head 27 merely a cylindrical mold 43'. The mold carrier 51' carries separate ring members 200, 201, 202 and 203. When the article is lowered as disclosed in Fig. 15, the ring 202 which is made in two parts can be removed and then upon the withdrawal of core 61' the article can be readily removed from the mold.

The upper end may be closed by any suitable means, but in the construction disclosed, there is a cover 204 provided with vent openings 205. Attached to the upper side of closure 204, there is a piston 206 working in a cylinder 207 mounted on the lower side of the oscillating head 24. A duct 208 is shown leading through the head to the cylinder. This is connected in any convenient way with source of high pressure fluid so that the high pressure is exerted in this cylinder at the same time that it is exerted through opening 58 to the exterior of the mold. The feeding means for this type of mold is not shown in detail, but may be substantially in accordance with the disclosure in the other figures or may be of any convenient construction. It will be readily understood that instead of having the oscillating head held down by high hydraulic pressure with a construction such as shown in Fig. 15, it will be possible to use any strong abutment to hold the head down and then produce the hydraulic holding effect through piston 206 and cylinder 207. In this way, the same result of relief of the end pressure and side pressure simultaneously may be obtained.

The construction disclosed in Fig. 16 is similar to that of Fig. 14 except that the insert rings 209, 210 and 211 are of somewhat different shape in order to produce a different shaped article. It will be readily understood that inserts of various other shapes may be employed, those shown being merely by way of illustration.

The apparatus disclosed in Figs. 17 to 19 forms a quite different article and in some ways the operation is preferably different. In this case the mold 52" constitutes approximately a cylinder with a rectangular opening in the center. A plate 212 is provided at the bottom of the mold opening and core 61" is substantially equidistant from the walls of the surrounding mold on the sides and top. The result is to produce a cavity having the shape of a narrow relatively deep cell rectangular in cross-section. In this case, there is shown a cover 213 which holds down the perforated shell 214 during the pressing operation. Packing 215 is provided to prevent leakage of the pressing fluid during the pressing operation. The upper side of cover 213 is attached to a piston 216 operating in a cylinder 217, the cylinder being connected to a suitable source of pressure by means of a duct 218.

Since in this form of apparatus shell 214 preferably remains permanently in place within the stationary head 27 the mold cannot be filled through this plate and the rubber lining 214a therebeneath, but the mold cavity can be readily filled in the position in which the mold is shown in Fig. 19, any suitable means being provided for filling the material into the mold.

While a complete machine has been disclosed and various modifications of molds which might be used in the machine have been shown, it will be readily understood that the various molds disclosed might be used without some portions of the other apparatus, and numerous features might be used without incorporating all of the improvements disclosed in this application. Therefore, the claims are not confined to the complete combination nor to the exact form and arrangement of parts, except insofar as they are defined in the claims.

What I claim is:

1. In a press in combination, a mold, a vertical rock shaft reciprocable longitudinally, means to oscillate the shaft between two positions, a closure for the upper end of the mold carried by the rock shaft and in register with the mold when the rock shaft is oscillated to one of said positions, and a filling device carried by the rock shaft and in register with the mold when the rock shaft is in the other of said positions.

2. In apparatus of the character described, a mold having flexible side walls, means to apply hydraulic pressure to the walls and press the walls inwardly, a vertical shaft, means to reciprocate the shaft longitudinally, means to oscillate the shaft between two positions, closure means for the upper end of the mold carried by the shaft and in register with the mold when the shaft is oscillated to one of said positions and filling means carried by the shaft and in register with the mold when the shaft is in the other of said positions.

3. In apparatus of the character described, a stationary mold holder, a mold within the holder having flexible side walls, means associated with the holder for applying hydraulic pressure to said walls and pressing said walls inwardly, a vertical shaft, means to reciprocate the shaft longitudinally, means to oscillate the shaft between two positions, a closure for the upper end of the mold in register with the mold when the shaft is in one of said positions and filling means carried by the shaft and in register with the mold when the shaft is in the other of said positions.

4. In apparatus of the character described, a mold having flexible side walls, means to apply hydraulic pressure to said walls and press the walls inwardly, a head mounted to oscillate between two positions, a filler carried by the head and registering with the mold when the head is in one of said positions, a closure for the top of the mold carried by the head and in register with the mold when the head is in the other of said positions.

5. In apparatus of the character described, a mold having flexible side walls, means to apply hydraulic pressure to said walls and press the walls inwardly, a head mounted to oscillate between two positions, a filler carried by the head and registering with the mold when the head is in one of the said positions, a closure for the top of the mold carried by the head and in register with the mold when the head is in the other of said positions, and hydraulic means for holding the head in mold closing position.

6. In apparatus of the character described, a mold, a vertical rock shaft, hydraulic means for reciprocating the rock shaft longitudinally, mechanical means to oscillate the shaft between two positions, a filler for the mold carried by the rock shaft and in register with the mold when the shaft is in one of said positions and a closure for the upper end of the mold carried by the rock shaft and in register with the mold when the shaft is in the other of said positions.

7. In apparatus of the character described, a vertically disposed mold, a vertical rock shaft parallel to the axis of the mold and positioned in spaced relation to said mold, a head carried by the rock shaft above the mold, means to oscillate the shaft and head between two positions, a closure for the upper end of the mold carried by the head and positioned to register with the mold when the head is in one of said positions, a filling hopper carried by the head and positioned to register with the mold when the head is in the other of said positions, a valve at the hopper, and means automatically opening the valve while the hopper is in register with the mold.

8. In apparatus of the character describer, a mold having flexible side walls, means to apply hydraulic pressure to the walls and press the walls inwardly, a rock shaft, hydraulic means to reciprocate the rock shaft longitudinally, and means carried by the rock shaft and closing an end of the mold while the rock shaft is held in one of its positions by the hydraulic means for reciprocating the shaft.

9. Apparatus of the character described comprising a mold holder, a mold within the holder and having flexible side walls, means associated with the holder for exerting hydraulic pressure on the exterior of said side walls, a rock shaft parallel to the axis of the mold and positioned in spaced relation to the mold, hydraulic means for reciprocating the shaft longitudinally, means for oscillating the shaft, a closure for an end of the mold carried by the rock shaft and positioned to register with the mold when the shaft is oscillated to one of its positions whereby said closure is brought to closing position by the hydraulic means for reciprocating the shaft when the shaft is reciprocated in one direction.

10. Apparatus of the character described comprising a mold having flexible side walls and means to apply hydraulic pressure to the walls and press the walls inwardly, a closure for one end of the mold, a reciprocable carrier for the closure, hydraulic means for actuating the carrier to hold the closure in closing position, and common means for simultaneously releasing the pressure on the side walls and the pressure holding the closure in closing position.

11. Apparatus in accordance with claim 10 and comprising resilient means tending to move the closure away from the mold when the hydraulic pressure is released.

12. Apparatus of the character described comprising a mold, a longitudinally reciprocable rock shaft, means to oscillate the shaft between two positions, a closure for the upper end of the mold carried by the rock shaft and in register with the mold when the shaft is oscillated to one of said positions, a filling device carried by the rock shaft and in register with the mold when the rock shaft is oscillated to the other of said positions and a vertically reciprocable support for the bottom of the mold.

13. Apparatus of the character described comprising a mold having flexible side walls and means to apply hydraulic pressure to the walls and press the walls inwardly, a vertical rock shaft, hydraulic means for reciprocating the shaft vertically, a closure for the upper end of the mold carried by the rock shaft, a support for the mold bottom, and hydraulic means for reciprocating said support.

14. Apparatus in accordance with claim 13 and comprising means for simultaneously releasing the hydraulic pressure on the mold walls, the pressure holding the closure down and the pressure holding the bottom support up.

15. Apparatus of the character described comprising a mold, a vertical rock shaft, means for oscillating the shaft between two positions, a closure for the top of the mold when the shaft is in one of said two positions, hydraulic means for reciprocating the shaft and holding the closure upon the mold when it is in register therewith, a support for the bottom of the mold, hydraulic means for holding the bottom support upward, and common means for simultaneously releasing the hydraulic pressure holding the bottom support up and the hydraulic pressure holding the top closure down.

16. Apparatus of the character described comprising a mold carrier, a portion of a mold supported permanently in said carrier, a bottom support movable towards and from the bottom of said carrier and carrying a portion of the mold, a vertical rock shaft, means to oscillate the rock shaft between two positions, a closure for the top of the mold carried by the rock shaft and in register with the mold when the rock shaft is in one of said positions and means to reciprocate the rock shaft longitudinally to move the closure to and from mold closing position.

17. Apparatus of the character described comprising a mold carrier, an upper portion of a flexible mold mounted in the carrier, a support movable towards and from the underside of the carrier, a lower part of a flexible walled mold carried by the support, a closure for the top of the mold, hydraulic means for holding the top closure in position on the mold, hydraulic means for holding the bottom support upward against the carrier and common means for releasing the hydraulic pressure on the flexible walls of the mold, the top closure and the bottom support.

18. Apparatus of the character described comprising a mold having flexible side walls, means to apply hydraulic pressure to the walls and press the walls inwardly, a closure for an end of the mold, hydraulic means for holding the closure in mold closing position and common means for simultaneously releasing the hydraulic pressure from the flexible walls and from the mold closure.

19. Apparatus of the character described and comprising a mold having flexible side walls, means to apply hydraulic pressure to the side walls and press the walls inwardly, a closure for the top of the mold, hydraulic means for holding the closure in closed position, a support for the bottom of the mold, hydraulic means for holding the support upward and common means for releasing the hydraulic pressure on the walls, closure and support.

20. Apparatus of the character described and comprising a mold holder, an upper portion of a mold fixed in said holder, a support movable towards and from the underside of said holder, a lower part of the mold mounted on said support and registering with the upper part of the mold when the support is raised, a core and reciprocable means for moving the core vertically with respect to the mold and support.

21. Apparatus of the character described and comprising a mold holder, an upper portion of a mold fixed in said holder, a support movable towards and from the underside of said holder, a lower part of the mold mounted on said support and registering with the upper part of the mold when the support is raised, a core, means raising and lowering the core with said support, and means for lowering the core below said support.

22. Apparatus of the character described and comprising a mold holder, the upper portion of a flexible mold fixed in said holder, a support movable to and from the underside of said holder, the lower portion of a flexible mold mounted upon said support and registering with the upper part of the mold when the support is raised, means to apply hydraulic pressure to the exterior of the mold, and a core for the mold positioned vertically, means to raise and lower the core with the support, and means to lower the core below the support.

23. Apparatus in accordance with claim 22 and means for raising and lowering the support comprising a vertically movable slide and the means to raise and lower the core with the support comprising a vertically movable slide below the said first mentioned vertically movable slide, and a shock absorber between the said slides whereby the core-carrying slide may be raised from its lowest position to place the core within the lower half of the mold and then pick up the support-carrying slide without shock to raise the core and lower part of the mold into mold-completing position.

24. Apparatus of the character described and comprising a mold, a hopper for filling the mold, a valve in the bottom of the hopper, a core, means for producing relative vertical movement between the mold and hopper, and a stem projecting downward from the valve and encountering the core and opening the valve when the hopper and mold are brought together.

25. Apparatus of the character described and comprising a vertically disposed mold, a vertical rock shaft parallel to the axis of the mold and positioned in spaced relation to said mold, means to reciprocate the shaft longitudinally, means to oscillate the shaft between two positions, a closure for the upper end of the mold carried by the rock shaft and in register with the mold when the shaft is in one of said positions, a filling device carried by the rock shaft and positioned to register with the mold when the rock shaft is in the other of said positions, a valve in the bottom of the hopper, and means to open the valve when the rock shaft is lowered with the hopper in register with the mold.

26. In apparatus of the character described and comprising a mold, a hopper above the mold, means to raise and lower the hopper with respect to the mold, a flexible pipe supplying material to the hopper, a valve in the bottom of the hopper and means to open the valve when the hopper is lowered onto the mold.

27. In apparatus for pressing ceramic powder, a mold, a hopper above the mold, a valve in the bottom of the hopper, means to raise and lower the hopper, means to open the valve when the hopper is lowered, and a flexible pipe supplying ceramic powder to the hopper.

28. In apparatus for pressing ceramic powder, a mold, a vertical rock shaft, means to reciprocate the shaft longitudinally, means to rock the shaft between two positions, a closure for the upper end of the mold carried by the rock shaft and in register with the mold when the shaft is in one of said positions, a hopper carried by the rock shaft and in register with the mold when the shaft is in the other of said positions, and a flexible pipe supplying ceramic powder to the hopper.

BENJAMIN A. JEFFERY.

CERTIFICATE OF CORRECTION.

Patent No. 2,290,910. July 28, 1942.

BENJAMIN A. JEFFERY.

It is hereby certified that error appears in the printed specification of the above numbered patent requiring correction as follows: Page 5, second column, line 50, claim 7, before "hopper" insert --bottom of the--; and that the said Letters Patent should be read with this correction therein that the same may conform to the record of the case in the Patent Office.

Signed and sealed this 15th day of September, A. D. 1942.

(Seal)

Henry Van Arsdale,
Acting Commissioner of Patents.